United States Patent [19]
Petraglia

[11] Patent Number: 5,811,202
[45] Date of Patent: Sep. 22, 1998

[54] HYBRID MOLTEN CARBONATE FUEL CELL WITH UNIQUE SEALING

[75] Inventor: Vincent J. Petraglia, Vernon, Conn.

[73] Assignee: M-C Power Corporation, Burr Ridge, Ill.

[21] Appl. No.: 906,674

[22] Filed: Aug. 5, 1997

[51] Int. Cl.⁶ .................................................. H01M 8/04
[52] U.S. Cl. .................. 429/35; 429/38; 429/39
[58] Field of Search ................................ 429/34, 35, 36, 429/38, 39, 46, 16

[56] References Cited

U.S. PATENT DOCUMENTS

| | | |
|---|---|---|
| 4,609,595 | 9/1986 | Nickols . |
| 4,708,916 | 11/1987 | Ogawa et al. . |
| 4,714,661 | 12/1987 | Kaun et al. . |
| 4,895,774 | 1/1990 | Ohzu et al. . |
| 4,942,099 | 7/1990 | Isobe et al. ................................ 429/35 |
| 4,963,442 | 10/1990 | Marianowski et al. . |
| 5,268,241 | 12/1993 | Meacham . |
| 5,342,706 | 8/1994 | Marianowski et al. ................ 429/39 X |
| 5,376,472 | 12/1994 | Hartvigsen et al. . |
| 5,472,800 | 12/1995 | Goto et al. . |
| 5,514,487 | 5/1996 | Washington et al. .................. 429/34 X |
| 5,527,634 | 6/1996 | Meacham . |
| 5,541,015 | 7/1996 | Tajima et al. . |
| 5,543,240 | 8/1996 | Lee et al. . |

*Primary Examiner*—Anthony Skapars
*Attorney, Agent, or Firm*—Speckman Pauley Petersen & Fejer

[57] ABSTRACT

A hybrid internal/external manifolded fuel cell stack comprising a plurality of fuel cell units, each of which comprises an anode and a cathode and an electrolyte in contact on one side with an electrolyte facing face of the anode and in contact on the opposite side with an electrolyte facing face of the cathode. A separator plate separates each of the fuel cell units between an anode and cathode forming an anode chamber between the anode facing face of the separator plate and the anode and forming a cathode chamber between the opposite cathode facing face of the separator plate and the cathode of an adjacent fuel cell unit. The anode chamber is in gas communication with a fuel gas supply and outlet provided through internal manifolds whereas the cathode chamber is in gas communication with an oxidant gas supply and outlet provided through external manifolds. Each of the separator plates, in addition to a wet seal structure for providing a wet seal between the separator plates and the electrolyte under cell operating conditions also comprises a dry peripheral seal structure at a distance from the peripheral wet seal structure, thereby forming a gap therebetween.

9 Claims, 2 Drawing Sheets

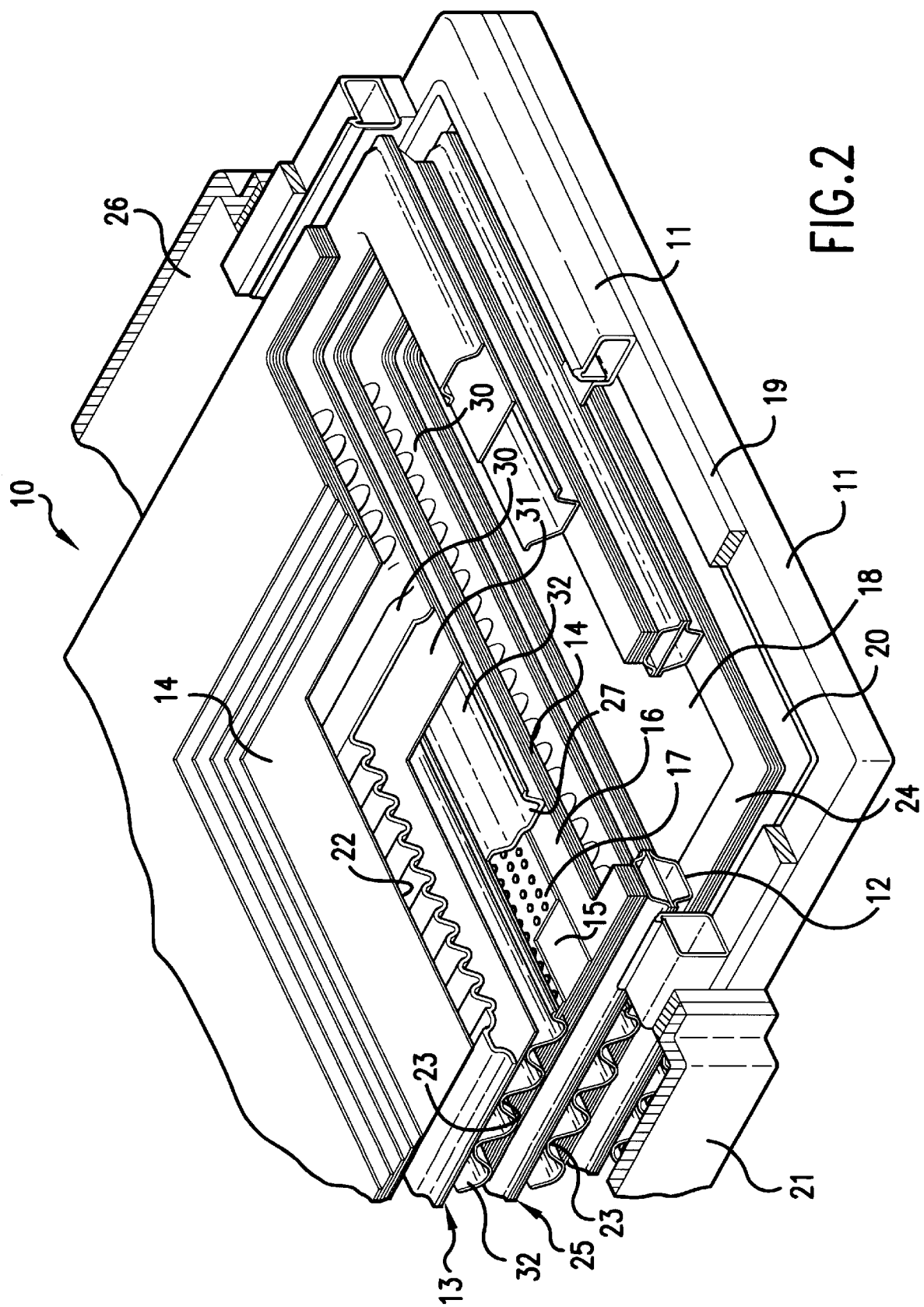

HYBRID MOLTEN CARBONATE FUEL CELL WITH UNIQUE SEALING

BACKGROUND OF THE INVENTION

1. Field of the Invention

This invention relates to a hybrid molten carbonate fuel cell in which fuel is supplied to the fuel cell through internal manifolds and oxidant is supplied through external manifolds. The fuel is sealed in the fuel cell by a matrix/electrolyte "wet" seal while the oxidant is provided to the cell by means of an external manifold sealed against the fuel cell stack by a "dry" seal. A gap is provided between the wet and dry seals to prevent electrolyte from transferring to the dry seal. This combination of seals avoids traditional problems of electrolyte transfer, inter-manifold gas communication, and complex external manifold seal geometries, coupled with "exotic" materials.

2. Description of Prior Art

A fuel cell stack is a device for generating electricity and comprises a plurality of fuel cell units. Each fuel cell unit directly converts chemical energy produced by an electrochemical reaction of a fuel gas and an oxidizing gas into electrical energy. The individual fuel cell units of the fuel cell stack are partitioned by separator plates which act to separate the reactant gases. Each individual cell generally includes an anode and cathode electrode, a common electrolyte tile, and a fuel and oxidant gas source. Both fuel and oxidant gas are introduced through manifolds to their respective reactant chambers disposed between the separator plate, the electrodes, and the electrolyte tile. The area of contact between the electrolyte and the separator plate at the perimeter and around the manifolds is referred to as the wet seal and maintains separation of the fuel and oxidant gases and prevents and/or minimizes gas leakage to the surroundings.

Fuel cells can be classified into several different categories. For example, molten carbonate fuel cells are fuel cells which operate at high temperatures ranging from about 500°–700° C., phosphoric acid fuel cells are cells which operate at temperatures around 200° C., alkaline fuel cells are cells which operate from room temperature to about 100° C., and solid oxide fuel cells are cells which operate at high temperatures of greater than about 1,000° C.

One problem with molten carbonate fuel cells in particular is that the electrolyte, which is molten carbonate at fuel cell operating conditions, has a tendency to migrate from the perimeter of the fuel cell unit along any wettable path, thereby creating the potential for leakage.

A major factor attributing to premature fuel cell failure, particularly in molten carbonate fuel cells, is corrosion and fatigue in the wet seal area. This failure is hastened by corrosive electrolyte contact at high temperatures and high thermal stresses resulting from large temperature variations during thermal cycling of the cell, causing weakening of the structure through intracrystalline and transcrystalline cracking. Such failures permit undesired fuel and/or oxidant gas crossover and overboard gas leakage which diminishes the intended oxidation and reduction reactions, thereby causing severely decreased cell current generation. Under fuel cell operating conditions, molten carbonate electrolytes are very corrosive to ferrous metals which, due to their strength, are required for fuel cell housings and separator plates. The high temperature operation of stacks and molten carbonate fuel cells increases both the corrosion and thermal stress problems in the wet seal area, especially when the thermal coefficients of expansion of adjacent materials are different.

One solution to this problem is taught by U.S. Pat. No. 4,963,442 which teaches a fully internal manifolding of the fuel and oxidant gases to the individual cells of an assembled stack in a manner utilizing conventional electrolyte/metal wet seals which, due to the design of the cell components, provides long term endurance and stability of fuel cell operation. Similarly, U.S. Pat. No. 5,268,241 and U.S. Pat. No. 5,527,634 teach fuel cell stacks having a plurality of internal manifolds for providing reactive gases to cell layers. In order to ensure even flow distribution of the reactive gases through the cell layers, the manifolds are distributed across the planar area of the cells so as to reduce the flow path lengths. Internal manifolding of a molten carbonate fuel cell is also taught by U.S. Pat. No. 4,708,916 and U.S. Pat. No. 5,376,472.

One emphasis in fuel cell development has been in external manifolding of the fuel and oxidant gases by using manifolds physically separated from the fuel cell stack. However, the inlets and outlets of each cell must be open to the respective inlet and outlet manifolds which must be clamped onto the exterior of the cell stack. To prevent electrical shorting, insulation must be used between the metal manifolds and the cell stack. External manifolding presents serious problems in maintaining adequate gas seals at the manifold/manifold gasket/cell stack interface while preventing carbonate migration within the gasket along the potential gradient of the cell stack. Various combinations of insulating the metal manifold from the cell stack have been used but, with the difficulty of providing a sliding seal which is gas tight and electrically insulating while being carbonate impermeable under high temperature molten carbonate fuel cell operating conditions, no satisfactory solution has been found. The problem of external manifolding and sealing becomes even more severe when large numbers of cells and larger planar areas are used in the cell stack. When greater numbers of cells are used, the electrical potential driving the carbonate in the seal area around the height of the stack increases, and when the planar area of the cell increases, the linear tolerances of each component and the side alignment of each component becomes extremely difficult to maintain in order to maintain the mating surface sealed between the manifold, manifold gasket, and cell stack. Such an externally manifolded molten carbonate fuel cell stack is taught by U.S. Pat. No. 4,895,774 and U.S. Pat. No. 5,472,800.

To deal with the problems associated with electrolyte migration and the need for compression of stack components, U.S. Pat. No. 4,714,661 teaches a molten carbonate electrolyte fuel cell having an array of stacked cells and cell enclosures which isolate each cell except for access to gas manifolds for the supply of fuel or oxidant gas or the removal of waste gas. The cell enclosures collectively provide an enclosure for the array. The fuel cell further comprises an inner housing about and in cooperation with the array enclosure to provide a manifold system with isolated chambers for the supply and removal of gases.

SUMMARY OF THE INVENTION

It is an object of this invention to provide a molten carbonate fuel cell stack design which provides effective sealing of the reactant gases from one another while preventing electrolyte migration.

It is another object of this invention to provide a combined internal and external manifolded fuel cell stack.

These and other objects of this invention are achieved by a fuel cell stack comprising a plurality of fuel cell units in which the fuel is delivered to the cell units by way of internal manifolds and oxidant is provided to the fuel cell units by an external manifold. More particularly, the fuel cell stack of this invention comprises a plurality of fuel cell units, each of which comprises an anode and a cathode, an electrolyte in contact on one side with an electrolyte facing face of the anode and in contact on the opposite side with an electrolyte facing face of the cathode. A separator plate separates the fuel cell units between an anode and cathode forming an anode chamber between the anode facing face of the separator plate and the anode, and forming a cathode chamber between the opposite cathode facing face of the separator plate and the cathode of an adjacent fuel cell unit. The anode chamber is in gas communication with an internally manifolded fuel gas supply and outlet and the cathode chamber is in gas communication with an externally manifolded oxidant gas supply and outlet.

The separator plates are formed of three pieces, an anode field plate, a cathode field plate, and a flat middle plate separating said anode field plate from said cathode field plate, and comprise a flattened peripheral wet seal structure extending to contact typically less than about one inch width of the electrolytes on each face of the separator plates completely around the anode chamber and partially around the cathode chamber, respectively, forming a peripheral wet seal less than about one inch width under cell operating conditions. The electrolytes and the separator plates each have a plurality of aligned perforations, the perforations in the separator plates being surrounded by a flattened manifold wet seal structure on the cathode facing face of the separator plates extending to contact less than about one inch width of the electrolyte, thereby forming a manifold wet seal less than about one inch width under cell operating conditions so as to form a plurality of fuel gas manifolds extending through the cell stack. Fuel conduits through the extended manifold wet seal structure provide fuel gas communication between the manifolds and the anode chambers on the anode side of the separator plates, thereby providing fully internal manifolding of fuel to and from each fuel cell unit in the fuel cell stack.

Each of the separator plates further comprises a dry peripheral seal structure which extends from each face of the separator plates at least partially around its periphery, extending to contact the dry peripheral seal structure of an adjacent separator plate, thereby forming a peripheral dry seal under cell operating conditions. Each of the separator plates forms a gap between the peripheral wet seal structure and the peripheral dry seal structure.

The fuel cell stack of this invention further comprises communication means for providing oxidant from an external oxidant manifold through the perimeter of the separator plates into the cathode chamber on the cathode side of the separator plates.

BRIEF DESCRIPTION OF THE DRAWINGS

These and other objects and features of this invention will be better understood from the following detailed description taken in conjunction with the drawings wherein:

FIG. 2 is a schematic diagram of a fuel cell stack in accordance with one embodiment of this invention showing the external oxidant manifold connected to said fuel cell stack.

DESCRIPTION OF PREFERRED EMBODIMENTS

Figure 1:
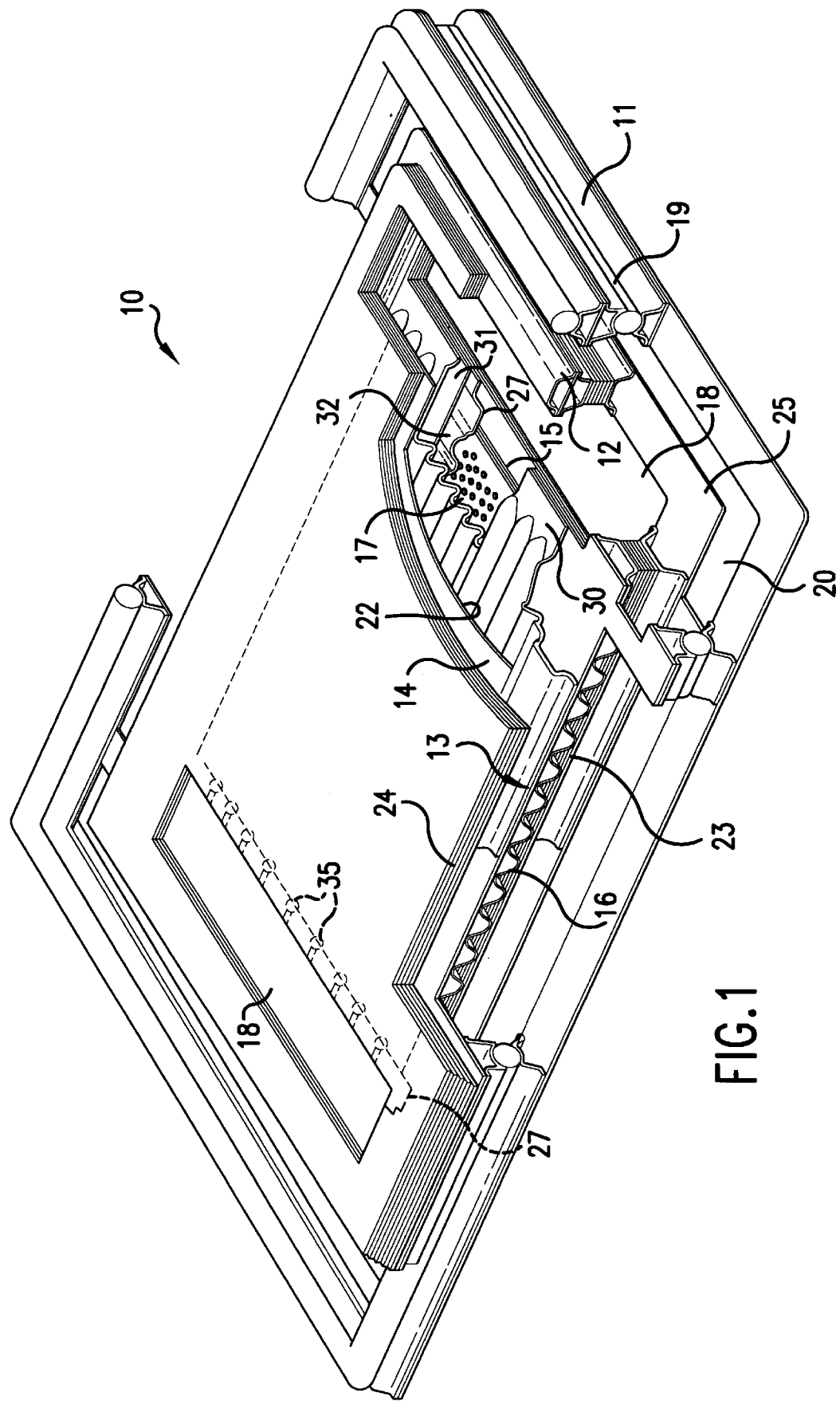
FIG. 1 is a cutaway view of a portion of a fuel cell stack having both wet and dry seals in accordance with one embodiment of this invention.

A portion of a fuel cell stack in accordance with one preferred embodiment of this invention is shown in FIG. 1.

Fuel cell stack 10 comprises a plurality of fuel cell units, each said fuel unit comprising an anode 14 and a cathode 15. Electrolyte 16, 24 is in contact on one side with an electrolyte facing face of anode 14 and in contact on the opposite side with an electrolyte facing face of cathode 15. A separator plate 13, 25 comprised of three pieces, anode field plate 30, cathode field plate 32, and a flat middle plate 31 disposed between anode field plate 30 and cathode field plate 32 separates the cell units between anode 14 and cathode 15 forming an anode chamber 22 between the anode facing face of anode field plate 30 of separator plate 13 and anode 14 and forming cathode chamber 23 between the opposite cathode facing face of cathode field plate 32 of separator plate 13 and cathode 15 of an adjacent fuel cell unit. Cathode current collector 17 is disposed between cathode electrode 15 and cathode field plate 32, providing support for cathode electrode 15 across the ribbed region of cathode field plate 32 of separator plate 13. Anode chamber 22 is in gas communication with a fuel gas supply, internal fuel manifold 18, and cathode chamber 23 is in gas communication with an oxidant gas supply, oxidant manifold 21 and oxidant outlet 26, shown in FIG. 2.

Separator plate 13 comprises flattened peripheral wet seal structure 12 which extends to contact preferably less than about one inch width of electrolyte 24, 16 on each face of separator plate 13 completely around anode chamber 22 and partially around cathode chamber 23, thereby forming a peripheral wet seal under cell operating conditions on the anode side of separator plate 13 and a partial peripheral wet seal under all operating conditions on the cathode side of separator plate 13. Electrolyte 16, 24 and separator plates 13, 25 each have a plurality of aligned perforations. The perforations in separator plates 13,25 are surrounded by a flattened manifold wet seal structure 27 formed by cathode field plate 32 extending to contact less than about one inch width of electrolyte 16 on the cathode side of separator plates 13, 25, thereby forming a fuel gas manifold wet seal less than about one inch width under cell operating conditions to form a plurality of fuel gas manifolds 18 extending through fuel cell stack 10. Fuel conduits 35 through flattened manifold wet seal structure 27 provide fuel gas communication between fuel gas manifolds 18 and anode chambers 22 on one face of separator plate 25, thereby providing fully internal manifolding of fuel to and from each said fuel cell unit in fuel cell stack 10.

Each separator plate 13, 25 further comprises a dry peripheral seal structure 11 extending laterally from the periphery of separator plates 13, 25 at least partially around its periphery. Seal means for sealing between peripheral dry seal structures 11 of adjacent separator plates 13, 25 are provided thereby forming a peripheral dry seal under cell operating conditions. Said seal means, for example, a gasket material 19, is disposed between peripheral dry seal structures 11 of adjacent separator plates 13, 25. Each of the separator plates 13, 25 form a gap 20 between peripheral wet seal structure 12 and peripheral dry seal structure 11.

As shown in FIG. 2, oxidant is provided to cathode chamber 23 through external oxidant manifold 21 secured to an edge region of fuel cell stack 10. Excess oxidant is withdrawn from cathode chamber 23 through oxidant exhaust manifold 26.

In accordance with one preferred embodiment of this invention, anode electrodes 14 and cathode electrodes 15 are coextensive with electrolyte 16, extending to a peripheral side of peripheral wet seal structure 12.

As previously stated, in accordance with one embodiment of this invention, the aligned perforations in separator plates 13, 25, electrolyte 16 and electrodes 14, 15 form manifold conduits which are continuous for the entire height of fuel cell stack 10 for fuel gas supply and exhaust. Thus, fuel gases are fed to fuel cell stack 10 through an end plate which acts as one half of a cell and are exhausted through a similar end plate which acts as another half cell.

Separator plates 13, 25 may be comprised of suitable materials providing desired physical strength and gas separation. In many fuel cell stacks, it is preferred to use bimetallic separator plates in which stainless steel may be used on the cathode side and nickel or copper on the anode side to avoid ferrous metal corrosion. Separator plates may also be fabricated from ferrous alloys, such as Type 300 Series stainless steel alloys. The separator plates provide the dual function of providing a gas chamber non-reactive separator as well as providing structural strength to the fuel cell as an internal load bearing member. The three-piece separator plate utilized in this invention permits independent design of fuel gas and oxidant gas flow patterns because the anode field plate 30 and the cathode field plate 32 are separate pieces. As a result, separator plates 13, 25 are ribbed on both sides, in accordance with one embodiment of this invention to provide both strength and better gas circulation adjacent to the electrodes. The fuel cell stack internal separator plates 13, 25 are desirably very thin sheets, on the order of about 0.005 to about 0.050 inches thick.

In accordance with another preferred embodiment of this invention, wet seal structure 12 and dry seal structure 11 on one face of separator plates 13, 25 comprise a pressed shaping of said separator plates 13, 25 to form said peripheral wet seal structure 12 and said dry peripheral seal structure 11 on said one face of separator plates 13, 25 and on the other face of separator plates 13, 25 comprises a pressed shape forming the peripheral wet seal structure 12 and the peripheral dry seal structure 11 fastened to the other face of separator plates 13, 25.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. In a fuel cell stack comprising a plurality of fuel cell units, each said fuel cell unit comprising an anode and a cathode, an electrolyte in contact on one side with an electrolyte facing face of said anode and in contact on the opposite side with the electrolyte facing face of said cathode, and a separator plate separating said cell units between an anode and cathode, of adjacent said cell units forming an anode chamber between the anode facing face of said separator plate and said anode and forming a cathode chamber between the opposite cathode facing face of said separator plate and the cathode of an adjacent fuel cell unit, said anode chamber in gas communication with a fuel gas supply and outlet and said cathode chamber in gas communication with an oxidant gas supply and outlet, the improvement comprising:

said separator plates having a flattened peripheral wet seal structure extending to contact less than about 1 inch width of said electrolytes on each face of said separator plates completely around said anode chamber and partially around said cathode chamber, respectively, forming a peripheral wet seal less than about 1 inch width under cell operating conditions;

said electrolytes and said separator plates each having a plurality of aligned perforations, said perforations in said separator plates being surrounded on said anode facing face by a flattened manifold wet seal structure extending to contact less than about 1 inch width of said electrolyte on said anode side of said separator plates, forming a manifold wet seal less than about 1 inch width under cell operating conditions to form a plurality of fuel gas manifolds extending through said cell stack;

fuel conduits through said flattened manifold wet seal structure providing fuel gas communication between said fuel gas manifolds and said anode chambers on said anode side of said separator plates, thereby providing fully internal manifolding of fuel to and from each said fuel cell unit in said fuel cell stack;

each of said separator plates having a dry peripheral seal structure extending from a periphery of said separator plates at least partially around its periphery;

seal means for sealing between said peripheral dry seal structures of adjacent said separator plates, forming a peripheral dry seal under cell operating conditions; and each of said separator plates forming a gap between said peripheral wet seal structure and said peripheral dry seal structure.

2. A fuel cell stack in accordance with claim 1 further comprising an external oxidant manifold secured to an edge region of said fuel cell stack, said external oxidant manifold providing said oxidant to said cathode chambers.

3. A fuel cell stack in accordance with claim 1, wherein said anodes and said cathodes are coextensive with said electrolyte, extending to a peripheral side of said peripheral wet seal structure.

4. A fuel cell stack in accordance with claim 3 further comprising a current collector disposed between at least one of said anode and said cathode and the corresponding face of said separator plate.

5. A fuel cell stack in accordance with claim 1, wherein cell stack end plates are configured the same as said separator plates on their inner faces and form half cells on each end of said fuel cell stack.

6. A fuel cell stack in accordance with claim 1, wherein said separator plates comprise an electronically conducting material and are about 0.005 to about 0.050 inches thick.

7. A fuel cell stack in accordance with claim 1, wherein said flattened peripheral wet seal structure and said dry peripheral seal structure on one said face of said separator plates comprises a pressed shaping of said separator plates to form said extended peripheral wet seal and said extended peripheral dry seal on said one face of said separator plates and on the other face of said separator plates comprises a pressed shape forming said extended peripheral wet seal and said extended peripheral dry seal fastened to said other face of said separator plates.

8. A fuel cell stack in accordance with claim 1, wherein said flattened manifold wet seal structure on said cathode facing face of said separator plates comprises a pressed shaping of said separator plates to form said manifold wet seal on said cathode facing face of said separator plates.

9. A fuel cell stack in accordance with claim 1, wherein said separator plate is constructed of three pieces, an anode field plate, a cathode field plate, and a flat middle plate disposed between said anode field plate and said cathode field plate.

* * * * *